UNITED STATES PATENT OFFICE.

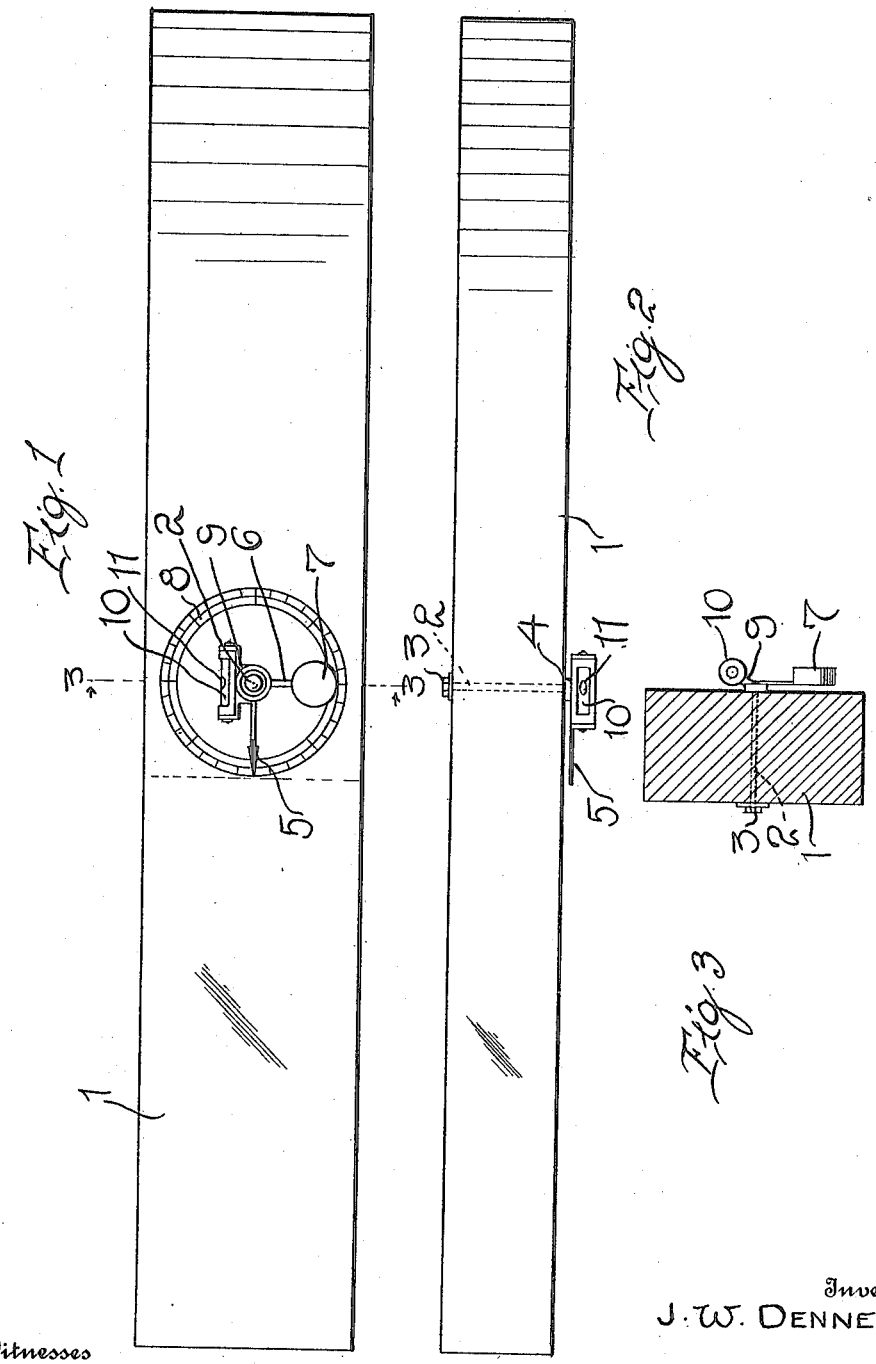

JOHN W. DENNEY, OF RAY, ARIZONA.

LEVEL.

1,135,163. Specification of Letters Patent. Patented Apr. 13, 1915.

Application filed October 8, 1913. Serial No. 794,071.

*To all whom it may concern:*

Be it known that I, JOHN W. DENNEY, a citizen of the United States, residing at Ray, in the county of Pinal and State of Arizona, have invented certain new and useful Improvements in Levels, of which the following is a specification, reference being had to the accompanying drawings.

This invention relates to new and useful improvements in levels and more particularly to that type known as spirit-levels, the object of the invention being to provide a level of this character which is especially adapted for use for leveling various objects and obtaining the angles of inclination of the same, the level itself being adapted to assume various positions from a horizontal to a vertical plane.

Another object of the invention is the provision of a spirit-level having an attachment connected thereto whereby the degree of inclination may be readily indicated and obtained through the medium of the level and the attachment.

A further object of the invention is the provision of a level of the above character which will possess advantages in points of efficiency and durability, is inexpensive of manufacture and at the same time is simple in construction and operation.

With the above and other objects in view, the invention consists in the novel features of construction and the combination and arrangement of parts to be hereinafter more fully described, pointed out in the claim and shown in the accompanying drawings, in which—

Figure 1 is a side elevation of a level constructed in accordance with my invention. Fig. 2 is a top plan view; and Fig. 3 is a transverse sectional view taken on the line 3—3, Fig. 1.

Referring more particularly to the drawing, 1 indicates the body of the level which is preferably elongated in form and substantially rectangular in cross section. Extending transversely through the body of the level is a pivot pin 2, having upon one end a retaining nut 3 and mounted upon the other end is a collar 4 having formed integral therewith an outwardly projecting indicator 5.

An arm 6 is further formed on the collar and is to be disposed at direct right angles with respect to the indicator 5 and mounted upon the outer end of the arm is a weight 7, which is normally disposed in a vertical position so that no matter in what position the body of the level is arranged, the weight will be retained in its normal position, whereby upon movement on the part of the level, the indicator will register upon the graduated ring 8, the angle at which the body of the level is disposed.

Mounted upon the collar 4 and arranged above the weight 7, is a bracket 9 in which is mounted a spirit tube 10 containing suitable liquid to provide an indicating bubble 11, whereby the device is adapted for use in retaining the level on various objects and also indicating the angle at which the body of the level is disposed.

From the above description taken in connection with the accompanying drawings, it will be readily apparent that I have provided a simple and durable level which may not only be used for leveling various objects but can be readily used for obtaining the angles of various objects and as illustrated, it will be apparent that the device is extremely simple in construction, the various auxiliary parts thereof may be quickly and readily attached or detached and the device as a whole can be manufactured at a comparatively low cost.

While I have shown and described the preferred form of my invention, it will be obvious that various changes in the details of construction and in the proportions may be resorted to for successfully carrying my invention into practice without sacrificing any of the novel features or departing from the scope of the appended claim.

What I claim is:—

A device of the class described including a level having a transverse pivot pin, a sleeve rotatably mounted thereon, an indicating arm formed on the sleeve, a weight supporting arm formed on the sleeve and disposed at right angles to the indicating arm, whereby to retain said indicating arm in the same general plane irrespective of the position of the level, a supporting bracket formed on the sleeve in direct opposition to the weight, a spirit tube supported within said bracket and a ring arranged around the pivot pin in spaced relation therewith and provided with a plurality of graduations, as and for the purpose set forth.

In testimony whereof I hereunto affix my signature in the presence of two witnesses.

JOHN W. DENNEY.

Witnesses:
C. A. HURST,
HARRY C. LA SALLE.

Copies of this patent may be obtained for five cents each, by addressing the "Commissioner of Patents, Washington, D. C."